United States Patent
Konoto et al.

(10) Patent No.: US 7,535,194 B2
(45) Date of Patent: May 19, 2009

(54) FUEL CELL SYSTEM BUILT AS A SYSTEM IN WHICH A FUEL CELL AND AN ELECTRIC DEVICE ARE PROVIDED IN PARALLEL

(75) Inventors: Masaaki Konoto, Kyoto (JP); Kazuhiro Seo, Hirakata (JP); Hiroshi Kurokawa, Yawata (JP); Masahiro Makino, Nara (JP)

(73) Assignee: Sanyo Electronic Co., Ltd., Osaka (JP)

( * ) Notice: Subject to any disclaimer, the term of this patent is extended or adjusted under 35 U.S.C. 154(b) by 452 days.

(21) Appl. No.: 11/392,629

(22) Filed: Mar. 30, 2006

(65) Prior Publication Data
US 2006/0220609 A1    Oct. 5, 2006

(30) Foreign Application Priority Data
Mar. 30, 2005   (JP)   .............................. 2005-097857
Mar. 10, 2006   (JP)   .............................. 2006-065470

(51) Int. Cl.
*H01M 10/46* (2006.01)
(52) U.S. Cl. ...................................... 320/101
(58) Field of Classification Search ................. 320/101, 320/110, 116, 141; 429/12, 18, 23
See application file for complete search history.

(56) References Cited

U.S. PATENT DOCUMENTS

| | | | | |
|---|---|---|---|---|
| 6,559,621 | B2* | 5/2003 | Corless et al. | 320/103 |
| 2002/0171397 | A1* | 11/2002 | ADRIAN et al. | 320/119 |
| 2004/0185317 | A1* | 9/2004 | Aoyagi et al. | 429/23 |
| 2006/0008688 | A1* | 1/2006 | Kamo et al. | 429/25 |

FOREIGN PATENT DOCUMENTS

JP          2004-71260          3/2004

* cited by examiner

*Primary Examiner*—Edward Tso
(74) *Attorney, Agent, or Firm*—NDQ&M Watchstone LLP

(57) ABSTRACT

A fuel cell system of the present invention includes a fuel cell stack, a fuel feeder that provides the fuel cell stack with fuel, a fuel cell DC/DC converter that converts the output voltage of the fuel cell stack to a predetermined voltage and then outputs it, a rechargeable battery that is an electric storage device, and a rechargeable battery DC/DC converter that converts the output voltage of the rechargeable battery to a predetermined voltage and then outputs it. The setting of a voltage at a node at which an output end of the fuel cell DC/DC converter and an output end of the rechargeable battery DC/DC converter are connected together is changeable, and the rechargeable battery is detachable. As a result, the fuel cell system of the present invention has high versatility.

8 Claims, 7 Drawing Sheets

FUEL CELL SYSTEM BUILT AS A SYSTEM IN WHICH A FUEL CELL AND AN ELECTRIC DEVICE ARE PROVIDED IN PARALLEL

This application is based on Japanese Patent Applications Nos. 2005-097857 and 2006-065470 filed on Mar. 30, 2005 and Mar. 10, 2006 respectively, the contents of which are hereby incorporated by reference.

BACKGROUND OF THE INVENTION

1. Field of the Invention

The present invention relates to a fuel cell system built as a system in which a fuel cell and an electric storage device are provided in parallel.

2. Description of Related Art

In recent years, there have been developed various types of fuel cell systems built as a system in which a fuel cell and an electric storage device are provided in parallel (for example, see JP-A-2004-71260). An example of the structure of a conventional fuel cell system is shown in FIG. 6.

The conventional fuel cell system shown in FIG. 6 is a system in which a fuel cell and an electric storage device are provided in parallel, and is provided with a fuel cell stack 1, a fuel feeder 2, a rechargeable battery 3, which is an electric storage device, a blocking diode D1, a DC/DC converter 5' for rechargeable battery (hereinafter referred to as a rechargeable battery DC/DC converter 5'), and a system output terminal 7. The system output terminal 7 is a direct current output terminal composed of a positive electrode terminal and a negative electrode terminal.

The fuel feeder 2 supplies the fuel cell stack 1 with a predetermined amount of fuel at regular intervals, and recovers the fuel that has not been consumed by the fuel cell stack 1. The fuel cell stack 1 has a positive electrode output end connected to a positive electrode terminal of the system output terminal 7 through the blocking diode D1. The rechargeable battery 3 is connected to an input end of the rechargeable battery DC/DC converter 5', and a positive electrode output end of the rechargeable battery DC/DC converter 5' is connected to the positive electrode terminal of the system output terminal 7. Though not shown in the drawing, negative electrode output ends of the fuel cell stack 1 and the rechargeable battery DC/DC converter 5' are connected to a negative electrode terminal of the system output terminal 7. The fuel cell system shown in FIG. 6 operates with electric power derived from the output of the fuel cell system, and, during system start-up, makes the fuel feeder 2 operate with the output of the rechargeable battery 3.

When the system output terminal 7 is connected to a direct current input terminal of an electric appliance (a load), electric power is supplied from the conventional fuel cell system shown in FIG. 6 to the electric appliance. In general, specifications of the fuel cell stack 1, the fuel feeder 2, the rechargeable battery 3, and the rechargeable battery DC/DC converter 5' are individually determined according to the electric appliance, and a voltage suitable for the electric appliance is outputted from the system output terminal 7. For example, when a direct current input terminal of the electric appliance is a 16V-direct current input terminal, the specifications of the fuel cell stack 1, the fuel feeder 2, the rechargeable battery 3, and the rechargeable battery DC/DC converter 5' are individually determined so that a voltage outputted from the system output terminal 7 becomes approximately 16 V.

As described above, the conventional fuel cell system shown in FIG. 6 has a specification tailored to a particular electric appliance (for example, an electric appliance having a 16 V-direct current input terminal), and thus cannot be offered as a versatile fuel cell system.

Here, a specification of the rechargeable battery 3 may be modified by using a rechargeable battery built in an electric appliance (a load) to be connected to the system output terminal 7 as the rechargeable battery 3 of the conventional fuel cell system shown in FIG. 6. In this case, however, it is necessary to provide the electric appliance with an extra direct current output terminal for outputting an output voltage of the rechargeable battery thereof, and thus inconveniently leads to problems such as increased cost of the electric appliance or inapplicability to existing electric appliances.

SUMMARY OF THE INVENTION

An object of the present invention is to provide a fuel cell system having high versatility.

To achieve the above object, a fuel cell system of the present invention includes: a fuel cell; a fuel feeder that supplies the fuel cell with fuel; a first DC/DC converter that converts the output voltage of the fuel cell to a predetermined voltage, and then outputs the predetermined voltage; an electric storage device; and a second DC/DC converter that converts the output voltage of the electric storage device to a predetermined voltage, and then outputs the predetermined voltage. The setting of a voltage at a node at which an output end of the first DC/DC converter and an output end of the second DC/DC converter are connected together is changeable, and the electric storage device is detachable. Some examples of the electric storage device are a rechargeable battery and an electric double layer capacitor.

With this structure, the setting of the voltage at the node at which the output end of the first DC/DC converter and the output end of the second DC/DC converter are connected together is changeable, and the electric storage device is detachable. This makes it possible to change the setting of the voltage to be outputted from the fuel cell system and the type of electric storage device depending on the electric appliance (the load), offering applicability to various types of electric appliances and high versatility.

To make it possible to change the setting of the voltage at the node at which the output end of the first DC/DC converter and the output end of the second DC/DC converter are connected together, for example, the first DC/DC converter may be built as a step-up DC/DC converter that can change the setting of the output voltage thereof and the upper limit to the step-up ratio thereof, and the second DC/DC converter may be built as a DC/DC converter that can change the setting of the output voltage thereof. Furthermore, by making a value obtained by multiplying an output voltage value of the fuel cell that is smaller than an output voltage value of the fuel cell at which an output electric power of the fuel cell reaches the maximum level by the upper limit to the step-up ratio of the first DC/DC converter smaller than a set value of the output voltage of the first DC/DC converter, it is possible to eliminate the possibility of shortening the lifetime of the fuel cell.

Preferably, the fuel cell system structured as described above includes a plurality of system output terminals that externally output the voltage at the node at which the output end of the first DC/DC converter and the output end of the second DC/DC converter are connected together, and a plurality of electric storage device connection terminals.

With this structure, it is possible to deal with a case where electric appliances (loads) having different specifications are different in the shape of a direct current input terminal thereof or a case where electric storage devices having different specifications are different in their shapes.

Preferably, the fuel cell system structured as described above includes an electric storage device charging part that charges the electric storage device by using the voltage at the node at which the output end of the first DC/DC converter and the output end of the second DC/DC converter are connected together.

With this structure, the electric storage device is detachable and it can be charged by using the electric storage device charging part. This makes it possible to use the fuel cell system as a charger for the electric storage device.

Preferably, in the fuel cell system structured as described above, at least one of the maximum current value of the second DC/DC converter and the upper limit value of the step-up ratio thereof can be changed depending on the type of the electric storage device. This makes it possible to protect the electric storage device and eventually the fuel cell system.

DETAILED DESCRIPTION OF PREFERRED EMBODIMENTS

Figure 1:
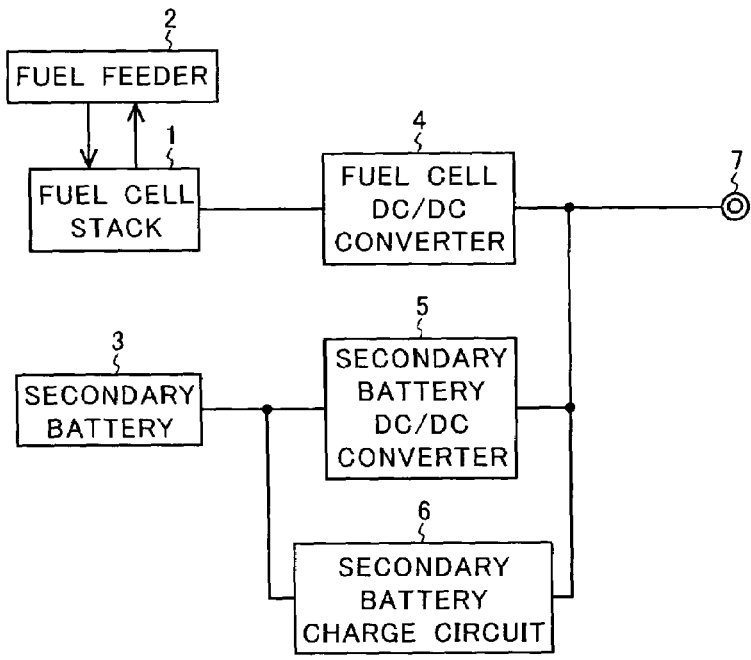
FIG. 1 is a diagram showing an example of the structure of the fuel cell system of the present invention.
Figure 6:
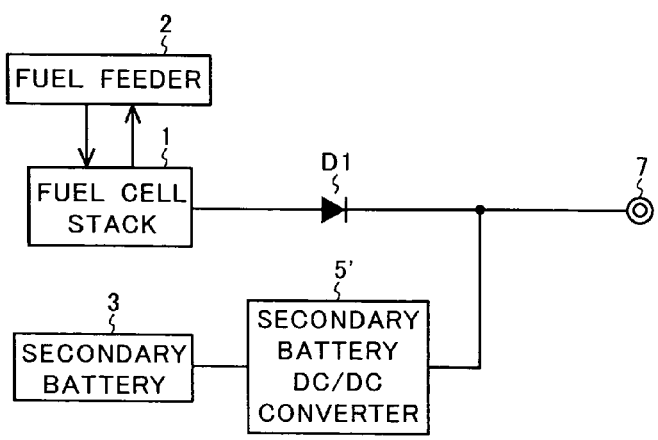
FIG. 6 is a diagram showing an example of the structure of a conventional fuel cell system.

Hereinafter, an embodiment of the present invention will be described with reference to the accompanying drawings. An example of the structure of the fuel cell system of the present invention is shown in FIG. 1. Note that, in FIG. 1, such members as are found also in FIG. 6 will be identified with common reference numerals.

The fuel cell system of the present invention shown in FIG. 1 is a system in which a fuel cell and an electric storage device are provided in parallel, and is provided with a fuel cell stack 1, a fuel feeder 2, a rechargeable battery 3, which is an electric storage device, a DC/DC converter 4 for fuel cell (hereinafter referred to as a fuel cell DC/DC converter 4), a DC/DC converter 5 for rechargeable battery (hereinafter referred to as a rechargeable battery DC/DC converter 5), a rechargeable battery charge circuit 6, and a system output terminal 7. The system output terminal 7 is a direct current output terminal composed of a positive electrode terminal and a negative electrode terminal.

The fuel feeder 2 supplies the fuel cell stack 1 with a predetermined amount of fuel at regular intervals, and recovers the fuel that has not been consumed by the fuel cell stack 1. The fuel cell stack 1 is connected to an input end of the fuel cell DC/DC converter 4, and a positive electrode output end of the fuel cell DC/DC converter 4 is connected to a positive electrode terminal of the system output terminal 7. The rechargeable battery 3 is connected to an input end of the rechargeable battery DC/DC converter 5 and to an output end of the rechargeable battery charge circuit 6, and a positive electrode output end of the rechargeable battery DC/DC converter 5 and a positive electrode input end of the rechargeable battery charge circuit 6 are connected to the positive electrode terminal of the system output terminal 7. A negative electrode output end of the fuel cell DC/DC converter 4, a negative electrode output end of the rechargeable battery DC/DC converter 5, and a negative electrode input end of the rechargeable battery charge circuit 6 are connected to a negative electrode terminal of the system output terminal 7. The fuel cell system of the present invention shown in FIG. 1 makes the fuel feeder 2 operate with electric power derived from the output of the fuel cell system, and, during system start-up, makes the fuel feeder 2 operate with electric power derived from the output of the rechargeable battery 3.

When the system output terminal 7 is connected to a direct current input terminal of an electric appliance (a load), electric power is supplied from the fuel cell system of the present invention shown in FIG. 1 to the electric appliance. The fuel cell DC/DC converter 4 steps up the direct current voltage outputted from the fuel cell stack 1 to a direct current voltage of a predetermined value (PV1), and then outputs it. The rechargeable battery DC/DC converter 5 steps up the direct current voltage outputted from the rechargeable battery 3 to a direct current voltage of a predetermined value (PV2), and then outputs it. Note that there is an upper limit to the step-up ratio of the fuel cell DC/DC converter 4. When the direct current voltage outputted from the fuel cell stack 1 is so small that it cannot reach, even multiplied by an upper limit value of the step-up ratio, the predetermined value (PV1), the output voltage of the fuel cell DC/DC converter 4 becomes lower than the predetermined value (PV1).

Incidentally, the output voltage value (PV1) of the fuel cell DC/DC converter 4 is made larger than the output voltage value (PV2) of the rechargeable battery DC/DC converter 5. As a result, when the outputtable electric power of the fuel cell stack 1 is equal to or higher than the electric power required by the electric appliance, only the output electric power of the fuel cell DC/DC converter 4 is supplied to the electric appliance through the system output terminal 7. On the other hand, when the outputtable electric power of the fuel cell stack 1 is lower than the electric power required by the electric appliance, the step-up ratio of the fuel cell DC/DC converter 4 reaches the upper limit thereof, then the output voltage of the fuel cell DC/DC converter 4 drops to the output voltage value (PV2) of the rechargeable battery DC/DC converter 5, and then the output electric power of the fuel cell DC/DC converter 4 and the output electric power of the rechargeable battery DC/DC converter 5 are supplied to the electric appliance through the system output terminal 7. Specifically, when the outputtable electric power of the fuel cell stack 1 is lower than the electric power required by the electric appliance, the rechargeable battery 3 supplies supplementary electric power (=the electric power required by the electric appliance minus the outputtable electric power of the fuel cell stack 1).

The rechargeable battery charge circuit 6 charges the rechargeable battery 3 by using surplus power (=the outputtable electric power of fuel cell stack 1 minus the electric power required by the electric appliance) when the outputtable electric power of the fuel cell stack 1 is higher than the electric power required by the electric appliance or by using the output electric power of the fuel cell stack 1 when the load, namely, the electric appliance does not operate.

The fuel cell system of the present invention shown in FIG. 1 can change the setting of the voltage to be outputted from the system output terminal 7. Specifically, the fuel cell DC/DC converter 4 is a DC/DC converter that can change the setting of the output voltage thereof and the upper limit to the step-up ratio thereof, the rechargeable battery DC/DC converter 5 is a DC/DC converter that can change the setting of the output voltage thereof, and the fuel cell system of the present invention shown in FIG. 1 has setting changing means (not shown in FIG. 1) that changes the setting of the output voltage of the fuel cell DC/DC converter 4 and the upper limit to the step-up ratio thereof and the setting of the output voltage of the rechargeable battery DC/DC converter 5. In addition to this, the fuel cell system of the present invention shown in FIG. 1 has a detachable rechargeable battery 3. This makes it possible to use various types of rechargeable batteries as the rechargeable battery 3. The fuel cell system of the present invention shown in FIG. 1 can change the setting of the voltage to be outputted from the system output terminal and the type of rechargeable battery depending on the electric appliance (the load), offering applicability to various types of electric appliances and high versatility. Furthermore, the rechargeable battery charge circuit 6 can charge the rechargeable battery 3 by using the output electric power of the fuel cell stack 1 when the load, namely, the electric appliance does not operate, and the rechargeable battery 3 is detachable. This makes it possible to use the fuel cell system of the present invention shown in FIG. 1 as a charger for the rechargeable battery 3.

Figure 2:
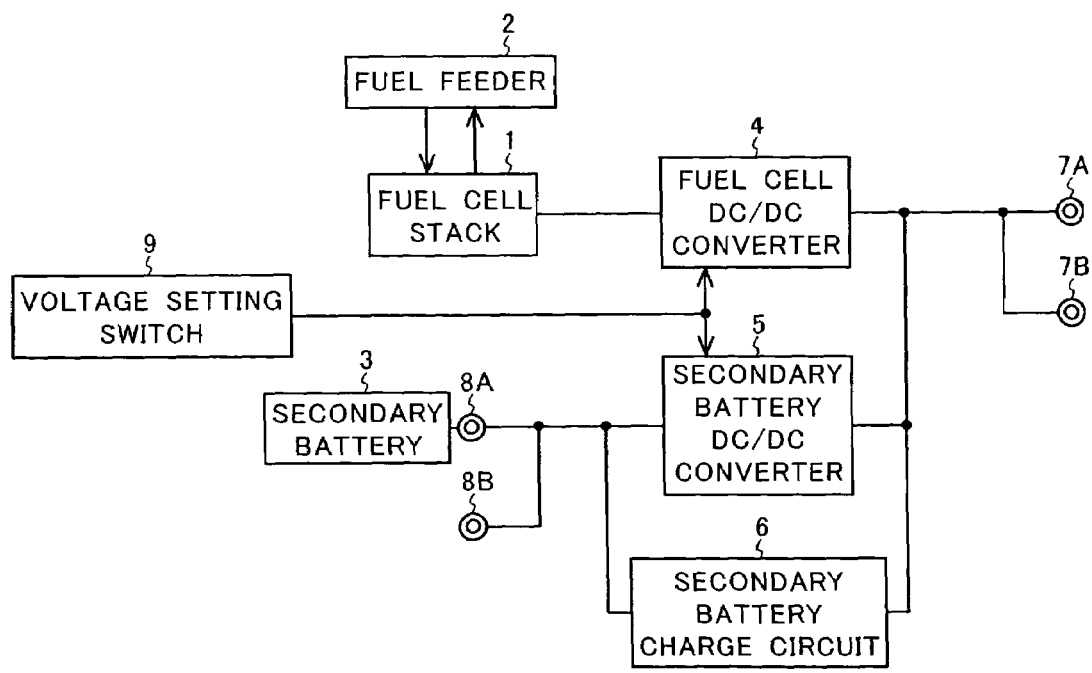
FIG. 2 is a diagram showing a specific example of the fuel cell system of the present invention.

Hereinafter, a fuel cell system having two types of output voltage settings, one for 16 V and another for 12 V, will be described as a specific example of the fuel cell system of the present invention shown in FIG. 1. FIG. 2 shows a specific example of the fuel cell system of the present invention shown in FIG. 1. Note that, in FIG. 2, such members as are found also in FIG. 1 will be identified with common reference numerals, and their explanations will not be repeated.

The fuel cell system shown in FIG. 2 further includes a voltage setting switch 9 as setting changing means that changes the setting of the output voltage of the fuel cell DC/DC converter 4 and the upper limit to the step-up ratio thereof and the setting of the output voltage of the rechargeable battery DC/DC converter 5. The fuel cell system shown in FIG. 2 further includes rechargeable battery connection terminals 8A and 8B and a plurality of system output terminals 7A and 7B, which correspond to the system output terminal 7.

A positive electrode output end of the fuel cell DC/DC converter 4, a positive electrode output end of the rechargeable battery DC/DC converter 5, and a positive electrode input end of the rechargeable battery charge circuit 6 are connected to positive electrode terminals of the system output terminals 7A and 7B. A negative electrode output end of the fuel cell DC/DC converter 4, a negative electrode output end of the rechargeable battery DC/DC converter 5, and a negative electrode input end of the rechargeable battery charge circuit 6 are connected to negative electrode terminals of the system output terminals 7A and 7B. Incidentally, the system output terminal 7A is shaped so that it can be connected to a 16 V-input terminal of the electric appliance, and the system output terminal 7B is shaped so that it can be connected to a 12 V-input terminal of the electric appliance. The rechargeable battery connection terminal 8A is shaped so that it can be connected to a rechargeable battery having a specification suitable for a case where the fuel cell system sets at 16 V, and the rechargeable battery connection terminal 8B is shaped so that it can be connected to a rechargeable battery having a specification suitable for a case where the fuel cell system sets at 12 V.

The voltage setting switch 9 switches between 16 V and 12 V in accordance with a user's operation.

When a rechargeable battery having a specification suitable for a case where the fuel cell system sets at 16 V is used as the rechargeable battery 3 and the rechargeable battery 3 is connected to the rechargeable battery connection terminal 8A, the voltage setting switch 9 sets at 16 V in accordance with a user's operation. In this case, the fuel cell DC/DC converter 4 sets the output voltage at 16 V and sets the upper limit to the step-up ratio at a value corresponding to 16 V in accordance with an instruction from the voltage setting switch 9, and the rechargeable battery DC/DC converter 5 sets the output voltage to 15.5 V in accordance with an instruction from the voltage setting switch 9. Then, the 16 V-input terminal of the electric appliance and the system output terminal 7A are connected together.

On the other hand, when a rechargeable battery having a specification suitable for a case where the fuel cell system sets at 12 V is used as the rechargeable battery 3 and the rechargeable battery 3 is connected to the rechargeable battery connection terminal 8B, the voltage setting switch 9 sets at 12 V in accordance with a user's operation. In this case, the fuel cell DC/DC converter 4 sets the output voltage at 12 V and sets the upper limit to the step-up ratio at a value corresponding to 12 V in accordance with an instruction from the voltage setting switch 9, and the rechargeable battery DC/DC converter 5 sets the output voltage to 11.5 V in accordance with an instruction from the voltage setting switch 9. Then, the 12 V-input terminal of the electric appliance and the system output terminal 7B are connected together.

When the 16 V-input terminal and the 12 V-input terminal of the electric appliance are identical to each other in shape, the system output terminals 7A and 7B can be made common. On the other hand, when the rechargeable battery having a specification suitable for a case where the fuel cell system sets at 16 V and the rechargeable battery having a specification suitable for a case where the fuel cell system sets at 12 V are identical to each other in shape, the rechargeable battery connection terminals 8A and 8B can be made common.

Figure 3:
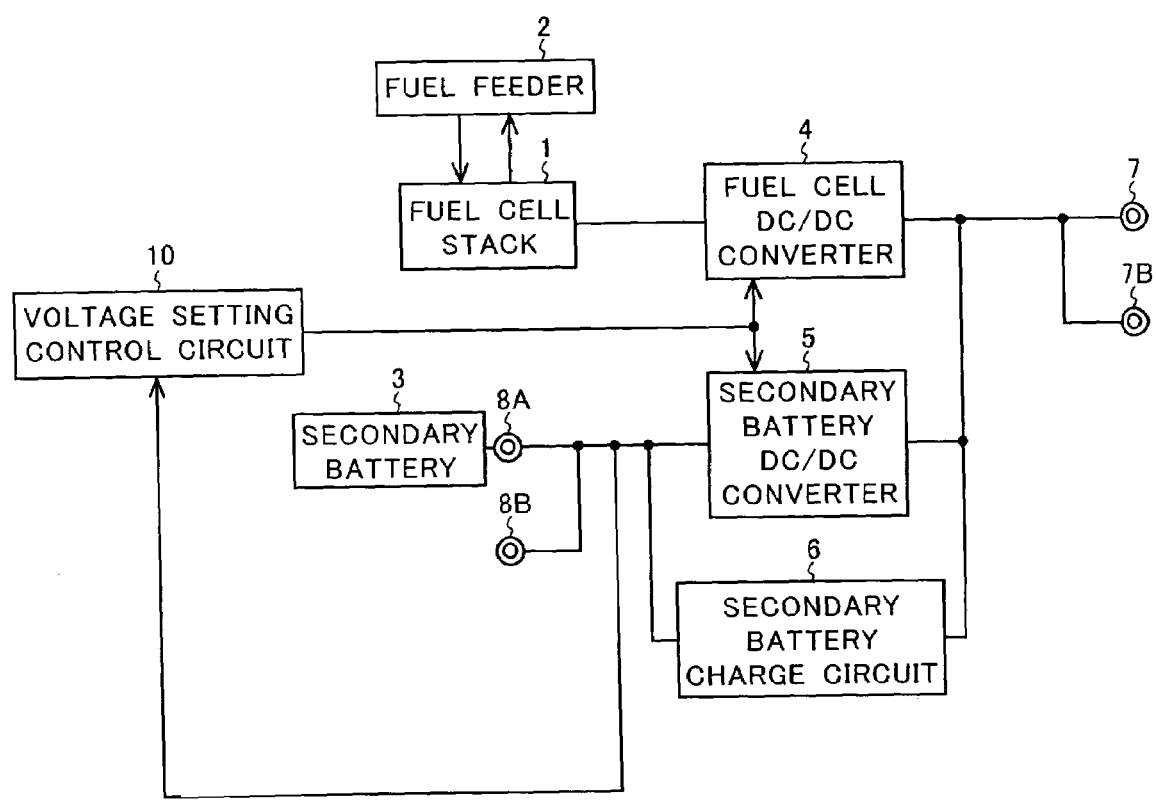
FIG. 3 is a diagram showing a specific example of the fuel cell system of the present invention.

Next, another specific example of the fuel cell system of the present invention shown in FIG. 1 is shown in FIG. 3. Note that, in FIG. 3, such members as are found also in FIG. 2 will be identified with common reference numerals, and their explanations will not be repeated.

The fuel cell system shown in FIG. 3 is structured on the assumption that the rechargeable battery having a specification suitable for a case where the fuel cell system sets at 16 V and the rechargeable battery having a specification suitable for a case where the fuel cell system sets at 12 V have different output voltage values.

The fuel cell system shown in FIG. 3 further includes a voltage setting control circuit 10 as setting changing means that changes the setting of the output voltage of the fuel cell DC/DC converter 4 and the upper limit to the step-up ratio thereof and the setting of the output voltage of the rechargeable battery DC/DC converter 5.

The voltage setting control circuit 10 switches between 16 V and 12 V in accordance with the output voltage of the rechargeable battery 3.

The voltage setting control circuit 10 detects the output voltage of the rechargeable battery 3 connected to the rechargeable battery connection terminal 8A, and then sets at 16 V. In this case, the fuel cell DC/DC converter 4 sets the output voltage at 16 V and sets the upper limit to the step-up ratio at a value corresponding to 16 V in accordance with an instruction from the voltage setting control circuit 10, and the rechargeable battery DC/DC converter 5 sets the output voltage at 15.5 V in accordance with an instruction from the voltage setting control circuit 10. Then, the 16 V-input terminal of the electric appliance and the system output terminal 7A are connected together.

On the other hand, the voltage setting control circuit 10 detects the output voltage of the rechargeable battery 3 connected to the rechargeable battery connection terminal 8B, and then sets at 12 V. In this case, the fuel cell DC/DC converter 4 sets the output voltage at 12 V and sets the upper limit to the step-up ratio at a value corresponding to 12 V in accordance with an instruction from the voltage setting control circuit 10, and the rechargeable battery DC/DC converter 5 sets the output voltage at 11.5 V in accordance with an instruction from the voltage setting control circuit 10. Then, the 12 V-input terminal of the electric appliance and the system output terminal 7B are connected together.

When the 16 V-input terminal and the 12 V-input terminal of the electric appliance are identical to each other in shape, the system output terminals 7A and 7B can be made common. On the other hand, when the rechargeable battery having a specification suitable for a case where the fuel cell system sets at 16 V and the rechargeable battery having a specification suitable for a case where the fuel cell system sets at 12 V are identical to each other in shape, the rechargeable battery connection terminals 8A and 8B can be made common.

Figure 4:
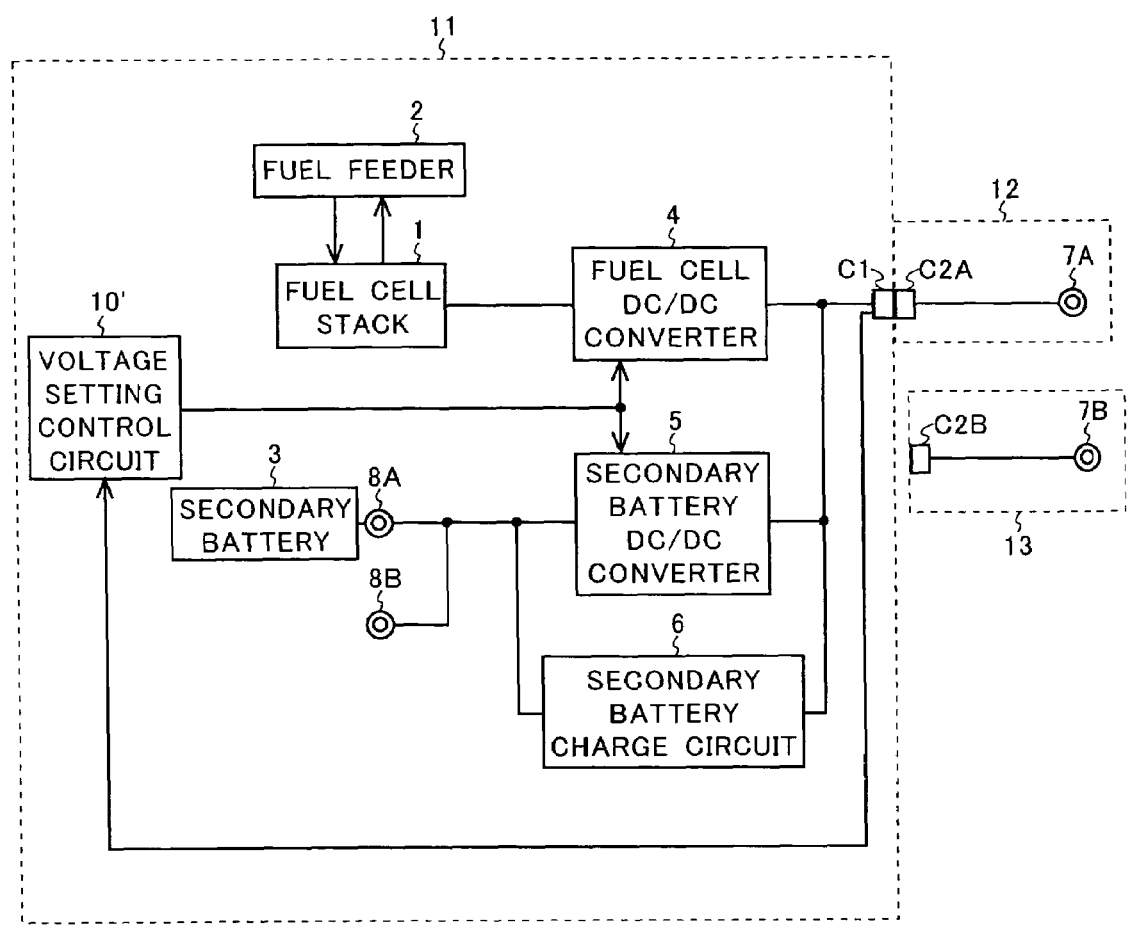
FIG. 4 is a diagram showing a specific example of the fuel cell system of the present invention.

Next, another specific example of the fuel cell system of the present invention shown in FIG. 1 is shown in FIG. 4. Note that, in FIG. 4, such members as are found also in FIG. 2 will be identified with common reference numerals, and their explanations will not be repeated.

The fuel cell system shown in FIG. 4 further includes a voltage setting control circuit 10' as setting changing means that changes the setting of the output voltage of the fuel cell DC/DC converter 4 and the upper limit to the step-up ratio thereof and the setting of the output voltage of the rechargeable battery DC/DC converter 5.

The fuel cell system shown in FIG. 4 is built with a main body portion 11, a first attached cable 12, and a second attached cable 13. The main body portion 11 includes the fuel cell stack 1, the fuel feeder 2, the rechargeable battery 3, the fuel cell DC/DC converter 4, the rechargeable battery DC/DC converter 5, the rechargeable battery charge circuit 6, the rechargeable battery connection terminals 8A and 8B, the voltage setting control circuit 10', and a connector C1. The rechargeable battery 3 is attachable to and detachable from the main body portion 11. The first attached cable 12 has a connector C2A and a system output terminal 7A, and the second attached cable 12 has a connector C2B and a system output terminal 7B.

The connector C1 has a first conductive terminal, a second conductive terminal, and a third conductive terminal. The first conductive terminal of the connector C1 is connected to a positive electrode output end of the fuel cell DC/DC converter 4, to a positive electrode output end of the rechargeable battery DC/DC converter 5, and to a positive electrode input end of the rechargeable battery charge circuit 6. The second conductive terminal of the connector C1 is connected to a negative electrode output end of the fuel cell DC/DC converter 4, to a negative electrode output end of the rechargeable battery DC/DC converter 5, and to a negative electrode input end of the rechargeable battery charge circuit 6. The third conductive terminal of the connector C1 is connected to the voltage setting control circuit 10'.

The connector C2A has a first conductive terminal, a second conductive terminal, and a third conductive terminal. The first conductive terminal of the connector C2A is connected to a positive electrode terminal of the system output terminal 7A, the second conductive terminal of the connector C2A is connected to a negative electrode terminal of the system output terminal 7A, and the third conductive terminal of the connector C2A is in an open state.

The connector C2B has a first conductive terminal, a second conductive terminal, and a third conductive terminal. The first conductive terminal of the connector C2B is connected to a positive electrode terminal of the system output terminal 7B, and the second and third conductive terminals of the connector C2B are connected to a negative electrode terminal of the system output terminal 7B.

The voltage setting control circuit 10' switches between 16 V and 12 V in accordance with the potential of the third conductive terminal of the connector C1. Specifically, when the third conductive terminal of the connector C1 is in an open state, the voltage setting control circuit 10' sets at 16 V, and, when the third conductive terminal of the connector C1 is at ground potential, the voltage setting control circuit 10' sets at 12 V.

When a rechargeable battery having a specification suitable for a case where the fuel cell system sets at 16 V is used as the rechargeable battery 3 and the rechargeable battery 3 is connected to the rechargeable battery connection terminal 8A, and the first to third conductive terminals of the connector C1 are electrically connected, respectively, to the first to third conductive terminals of the connector C2A by connecting the connector C1 and the connector C2A, the voltage setting control circuit 10' sets at 16 V. In this case, the fuel cell DC/DC converter 4 sets the output voltage at 16 V and sets the upper limit to the step-up ratio at a value corresponding to 16 V in accordance with an instruction from the voltage setting control circuit 10', and the rechargeable battery DC/DC converter 5 sets the output voltage at 15.5 V in accordance with an instruction from the voltage setting control circuit 10'. Then, the 16 V-input terminal of the electric appliance and the system output terminal 7A are connected together.

On the other hand, when a rechargeable battery having a specification suitable for a case where the fuel cell system sets at 12 V is used as the rechargeable battery 3 and the rechargeable battery 3 is connected to the rechargeable battery connection terminal 8B, and the first to third conductive terminals of the connector C1 are electrically connected, respectively, to the first to third conductive terminals of the connector C2B by connecting the connector C1 and the connector C2B, the voltage setting control circuit 10' sets at 12 V. In this case, the fuel cell DC/DC converter 4 sets the output voltage at 12 V and sets the upper limit to the step-up ratio at a value corresponding to 12 V in accordance with an instruction from the voltage setting control circuit 10', and the rechargeable battery DC/DC converter 5 sets the output voltage at 11.5 V in accordance with an instruction from the voltage setting control circuit 10'. Then, the 12 V-input terminal of the electric appliance and the system output terminal 7B are connected together.

When the rechargeable battery having a specification suitable for a case where the fuel cell system sets at 16 V and the rechargeable battery having a specification suitable for a case where the fuel cell system sets at 12 V are identical to each other in shape, the rechargeable battery connection terminals 8A and 8B can be made common.

Figure 5:
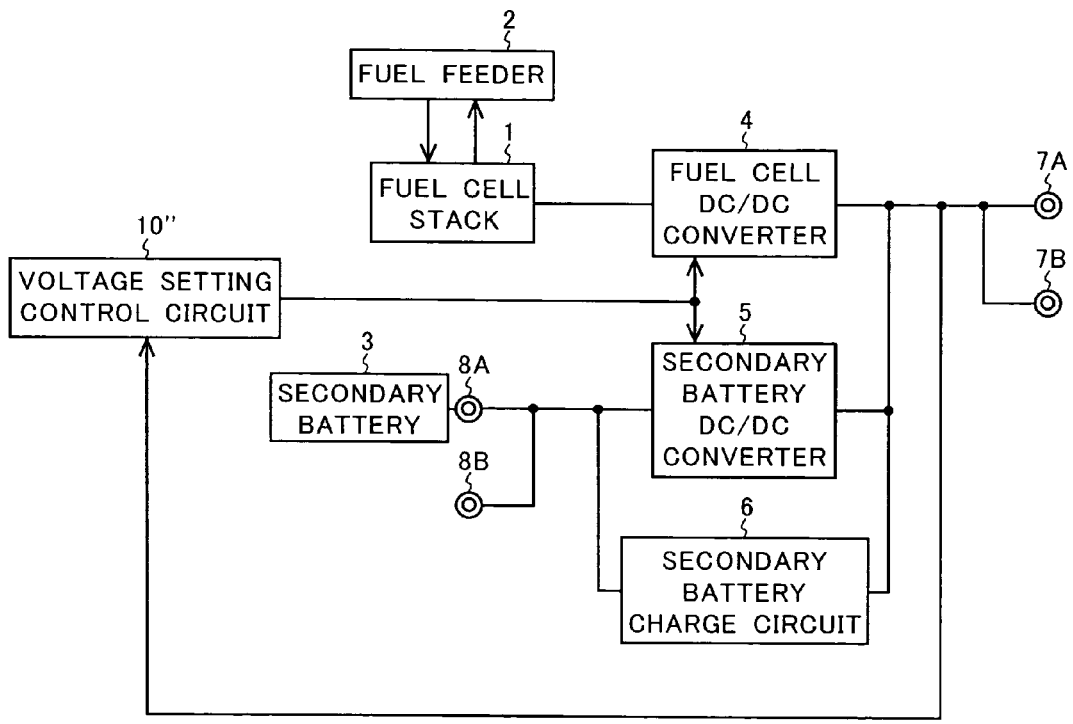
FIG. 5 is a diagram showing a specific example of the fuel cell system of the present invention.

Next, another specific example of the fuel cell system of the present invention shown in FIG. 1 is shown in FIG. 5. Note that, in FIG. 5, such members as are found also in FIG. 2 will be identified with common reference numerals, and their explanations will not be repeated.

The fuel cell system shown in FIG. 5 is structured on the assumption that a signal about a voltage setting (a voltage setting signal) is outputted from a direct current input terminal of an electric appliance (a load) to be connected to the system output terminal 7A or 7B, and cannot be applied to an existing electric appliance. For this reason, the structures shown in FIGS. 2 to 4 are preferable to that shown in FIG. 5.

The fuel cell system shown in FIG. 5 further includes a voltage setting control circuit 10" as setting changing means that changes the setting of the output voltage of the fuel cell DC/DC converter 4 and the upper limit to the step-up ratio thereof and the setting of the output voltage of the rechargeable battery DC/DC converter 5.

The voltage setting control circuit 10" switches between 16 V and 12 V in accordance with a voltage setting signal that is outputted from the direct current output terminal of the electric appliance (the load) and then inputted to the system output terminal 7A or 7B.

When a rechargeable battery having a specification suitable for a case where the fuel cell system sets at 16 V is used as the rechargeable battery 3 and the rechargeable battery 3 is connected to the rechargeable battery connection terminal 8A, the voltage setting control circuit 10" sets at 16 V according to a voltage setting signal from the direct current input terminal of the electric appliance connected to the system output terminal 7A. In this case, the fuel cell DC/DC converter 4 sets the output voltage at 16 V and sets the upper limit to the step-up ratio at a value corresponding to 16 V in accordance with an instruction from the voltage setting control circuit 10", and the rechargeable battery DC/DC converter 5 sets the output voltage at 15.5 V in accordance with an instruction from the voltage setting control circuit 10".

On the other hand, when a rechargeable battery having a specification suitable for a case where the fuel cell system sets at 12 V is used as the rechargeable battery 3 and the rechargeable battery 3 is connected to the rechargeable battery connection terminal 8B, the voltage setting control circuit 10" sets at 12 V according to a voltage setting signal from the direct current input terminal of the electric appliance connected to the system output terminal 7B. In this case, the fuel cell DC/DC converter 4 sets the output voltage at 12 V and the upper limit to the step-up ratio at a value corresponding to 12 V in accordance with an instruction from the voltage setting control circuit 10", and the rechargeable battery DC/DC converter 5 sets the output voltage at 11.5 V in accordance with an instruction from the voltage setting control circuit 10".

When the 16 V-input terminal and the 12 V-input terminal of the electric appliance are identical to each other in shape, the system output terminals 7A and 7B can be made common. On the other hand, when the rechargeable battery having a specification suitable for a case where the fuel cell system sets at 16 V and the rechargeable battery having a specification suitable for a case where the fuel cell system sets at 12 V are identical to each other in shape, the rechargeable battery connection terminals 8A and 8B can be made common.

The embodiment described above deals with two types of output settings. It is to be noted that, however, there may be three or more types of output settings. Incidentally, the embodiment described above deals with an example in which a rechargeable battery is used as an electric storage device. It is to be noted that, however, instead of the rechargeable battery, an electric storage device of any other type (for example, an electric double layer capacitor) may be used.

Figure 7:
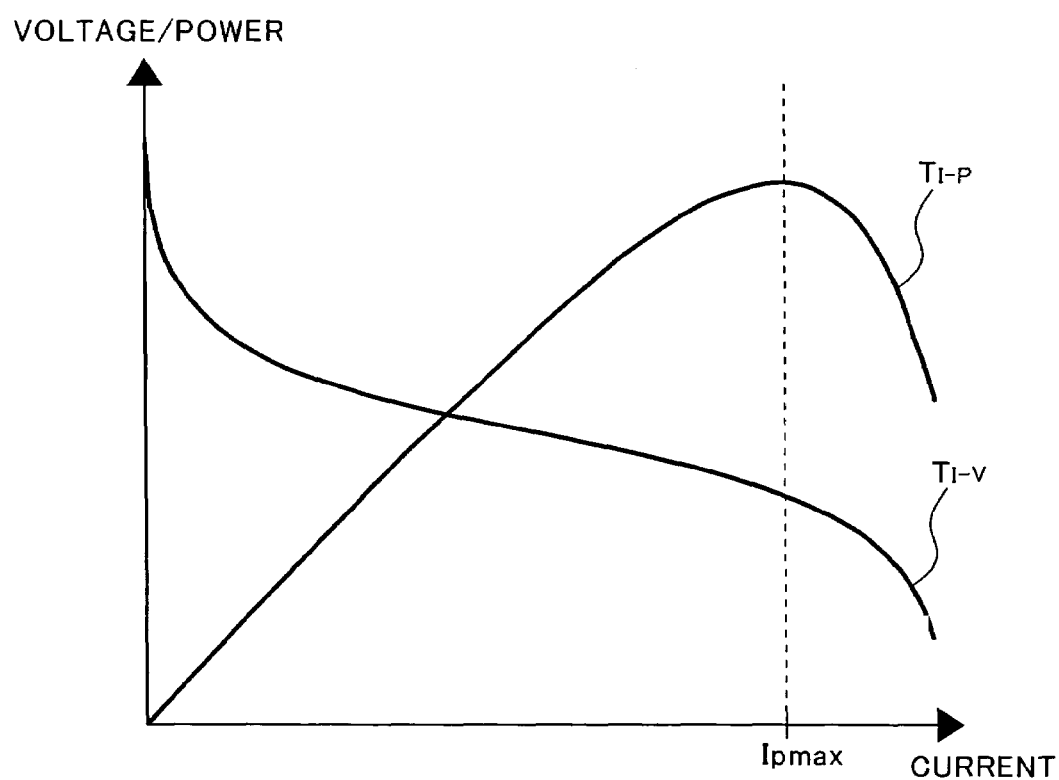
FIG. 7 is a graph showing a current-voltage characteristic and a current-power characteristic of the fuel cell stack.

In the embodiment described above, since the fuel feeder 2 supplies the fuel cell stack 1 with a predetermined amount of fuel at regular intervals, a current-voltage characteristic and a current-power characteristic of the fuel cell stack 1 behave as shown in FIG. 7. The symbols $T_{1-V}$ and $T_{1-P}$ shown in FIG. 7 indicate an output current-output voltage characteristic curve and an output current-output power characteristic curve, respectively, of the fuel cell stack 1.

The output voltage of the fuel cell stack 1 varies according to the output current thereof. Specifically, the larger the output current becomes, the lower the output voltage becomes. The output current value Ipmax at which the output electric power reaches the maximum level depends on the amount of fuel supplied to the fuel cell stack 1 from the fuel feeder 2. Operation of the fuel cell stack 1 is unstable within the current range larger than Ipmax (the unstable region). When the fuel cell stack 1 continues operating within the current range larger than Ipmax (the unstable region), it may result in a shorter lifetime of the fuel cell stack 1.

Advisably, the upper limit to the step-up ratio of the fuel cell DC/DC converter 4 is set in consideration of such properties of the fuel cell stack 1. Specifically, the upper limit to the step-up ratio of the fuel cell DC/DC converter 4 is set so that the result of multiplying the output voltage of the fuel cell stack 1 within the current range larger than Ipmax (the unstable region) by the upper limit to the step-up ratio of the fuel cell DC/DC converter 4 does not reach the predetermined value (PV1).

In view of protecting the electric storage device and eventually the fuel cell system, in the embodiment described above, it is preferable that at least one of the maximum current value of the rechargeable battery DC/DC converter 5 and the upper limit value of the step-up ratio thereof be changeable automatically or manually depending on the type of the rechargeable battery 3 that is the electric storage device. By doing this, it is possible to set the maximum current and the maximum electric power of the rechargeable battery 3 that is the electric storage device depending on the type of the rechargeable battery 3. This makes it possible to properly protect the rechargeable battery 3 of any type. In the case of automatic setting, advisably, there is provided means that gives and receives (or only receives) information to and from the rechargeable battery 3 that is the electric power storage device, thereby changing at least one of the maximum current value of the rechargeable battery DC/DC converter 5 and the upper limit value of the step-up ratio thereof based on the information thus received. On the other hand, in the case of manual setting, advisably, there is provided a setting switch that switches the setting in accordance with a user's operation, thereby making the setting switch change at least one of the maximum current value of the rechargeable battery DC/DC converter 5 and the upper limit value of the step-up ratio thereof.

Hereinafter, examples of use of the fuel cell system of the present invention will be described.

First, an example in which the fuel cell system of the present invention is used as an electric power source of a notebook computer will be described.

Figure 8A:
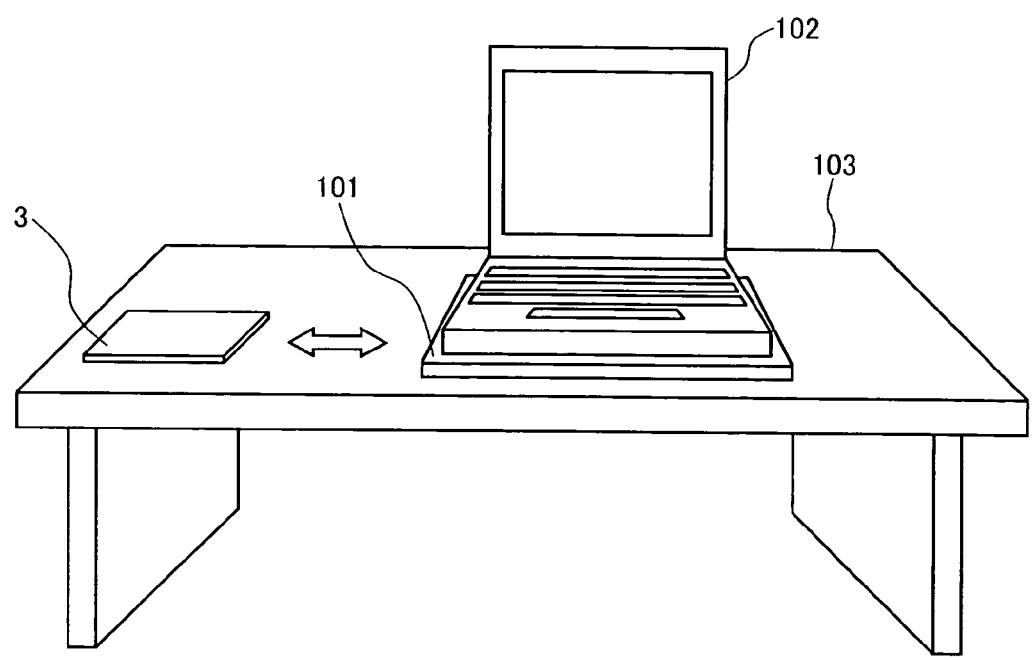
FIG. 8A is an illustration showing a state in which the fuel cell system of the present invention is used as an electric power source of a notebook computer.

FIG. 8A is an illustration showing a state in which the fuel cell system of the present invention is used as an electric power source of the notebook computer. A fuel cell system 101 of the present invention is placed on top of a desk 103 in a conference room, for example. The system output terminal 7A or 7B (not shown in FIG. 8A, see FIGS. 2 to 5) of the fuel cell system 101 of the present invention is connected to a power source input terminal (not shown) of a notebook computer 102, and the rechargeable battery 3 that is the same type as used in the notebook computer 102 is connected to the rechargeable battery connection terminal 8A or 8B (not shown in FIG. 8A, see FIGS. 2 to 5) of the fuel cell system of the present invention. The output voltage of the fuel cell system 101 of the present invention is set by the user by operating the voltage setting switch 9 (see FIG. 2) or by the control operation of the voltage setting control circuit 10, 10', or 10" (see FIGS. 3 to 5). In this case of use, since the fuel cell system of the present invention is used as the electric power source of the notebook computer, it is possible to use the notebook computer as if it was connected to an AC adapter. Thus, it is possible to extend the operating time of the notebook computer without worrying about the electric power remaining in the battery of the notebook computer.

Figure 8B:
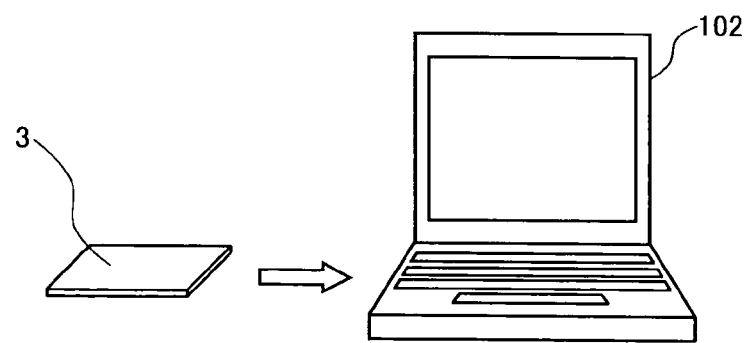
FIG. 8B is an illustration showing a state in which a battery of a notebook computer is replaced with the rechargeable battery connected to the fuel cell system of the present invention.

On the other hand, when the notebook computer 102 is used in a different location having no fuel cell system 101 of the present invention or in a location having no AC power source, the battery (not shown) of the notebook computer 102 can be replaced with the rechargeable battery 3 that has been connected to the fuel cell system 101 of the present invention, as shown in FIG. 8B, or the rechargeable battery 3 can be carried along as an auxiliary electric power source. This makes it possible to use the notebook computer over an extended period of time.

The following description deals with a case where the fuel cell system of the present invention is used as an electric power source of a hand-held video camera.

In general, hand-held video cameras use a battery as an electric power source thereof during shooting, and use an AC adapter as an electric power source thereof in editing operations. Chargers (AC adapters) commonly used for the hand-held video cameras cannot charge the battery during editing operations.

Figure 9A:
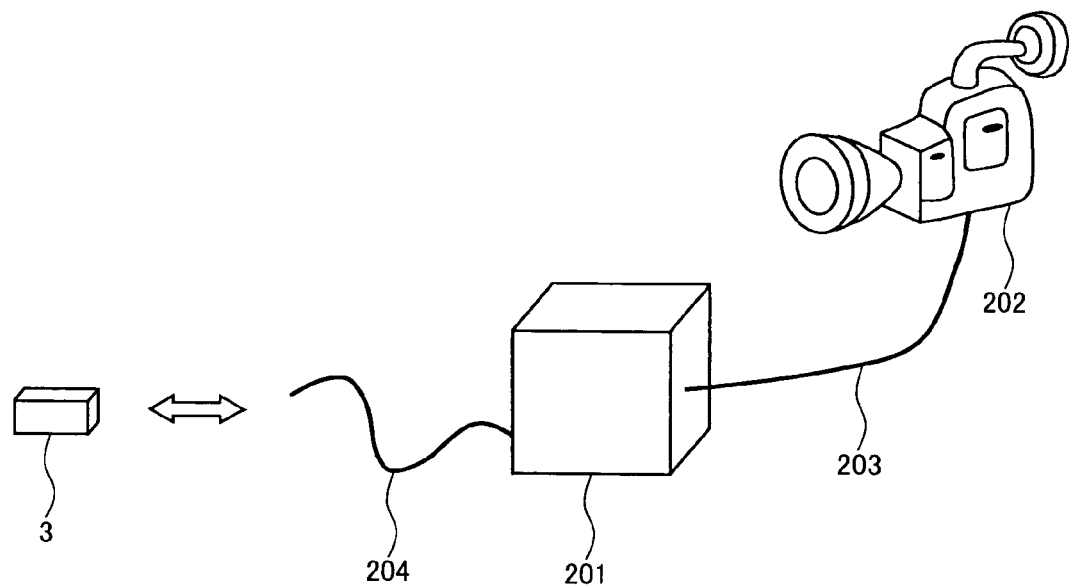
FIG. 9A is an illustration showing a state in which the fuel cell system of the present invention is used as an electric power source of a hand-held video camera in editing operations.

FIG. 9A is an illustration showing a state in which the fuel cell system of the present invention is used as an electric power source of the hand-held video camera in editing operations. The output terminal 7A or 7B (not shown in FIG. 9A, see FIGS. 2 to 5) of a fuel cell system 201 of the present invention is connected to a power source input terminal (not shown) of a hand-held video camera 202 through a power cable 203, and the rechargeable battery 3 that is the same type as used in the hand-held video camera 202 or the battery itself used in the hand-held video camera 202 is connected to the rechargeable battery connection terminal 8A or 8B (not shown in FIG. 9A, see FIGS. 2 to 5) of the fuel cell system of the present invention through a power cable 204. It is to be noted that the fuel cell system 201 of the present invention may be directly connected to the hand-held video camera 202 not through the power cable 203, and the fuel cell system 201 of the present invention may be directly connected to the rechargeable battery 3 not through the power cable 204. The output voltage of the fuel cell system 201 of the present invention is set by the user by operating the voltage setting switch 9 (see FIG. 2) or by the control operation of the voltage setting control circuit 10, 10', or 10" (see FIGS. 3 to 5). In this case of use, when the outputtable electric power of the fuel cell stack built in the fuel cell system 201 of the present invention is higher than the electric power required by the hand-held video camera 202, the rechargeable battery 3 is charged. Thus, unlike the chargers (AC adapters) commonly used for hand-held video cameras, it is possible to charge the battery while performing the editing operations. As described above, it is possible to charge the battery while performing the editing operations, making it possible to begin shooting immediately after the editing operations by using the battery as an electric power source.

Figure 9B:
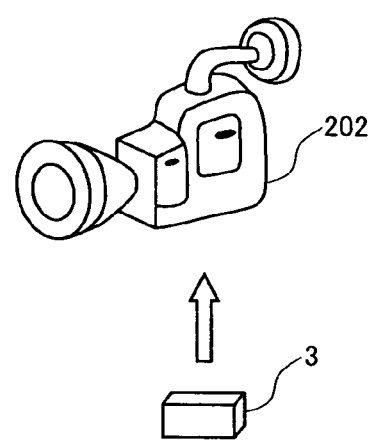
FIG. 9B is an illustration showing a state in which a battery in a hand-held video camera is replaced with the rechargeable battery connected to the fuel cell system of the present invention.

After the editing operations, as shown in FIG. 9B, it is possible to begin shooting by replacing the battery (not shown) in the hand-held video camera 202 with the rechargeable battery 3 that has been connected to the fuel cell system 201 of the present invention or carry along the rechargeable battery 3 as an auxiliary electric power source.

What is claimed is:

1. A fuel cell system comprising:
   a fuel cell;
   a fuel feeder that supplies the fuel cell with fuel;
   a first DC/DC converter that converts an output voltage of the fuel cell to a first predetermined voltage, and then outputs the first predetermined voltage;
   an electric storage device; and
   a second DC/DC converter that converts an output voltage of the electric storage device to a second predetermined voltage, and then outputs the second predetermined voltage,
   wherein setting of a node-voltage at a node at which an output end of the first DC/DC converter and an output end of the second DC/DC converter are connected together is changeable, and
   wherein the electric storage device is detachable.

2. The fuel cell system of claim 1, wherein the electric storage device is a rechargeable battery.

3. The fuel cell system of claim 1, wherein the electric storage device is an electric double layer capacitor.

4. The fuel cell system of claim 1, wherein the first DC/DC converter is a step-up DC/DC converter that can change setting of the first output voltage thereof and an upper limit to a step-up ratio thereof, and wherein the second DC/DC converter is a DC/DC converter that can change setting of the second output voltage thereof.

5. The fuel cell system of claim 1, further comprising:
   a plurality of system output terminals that externally output the node-voltage at the node at which the output end of the first DC/DC converter and the output end of the second DC/DC converter are connected together; and
   a plurality of electric storage device connection terminals.

6. The fuel cell system of claim 1, further comprising:
   an electric storage device charging part that charges the electric storage device by using the node-voltage at the node at which the output end of the first DC/DC converter and the output end of the second DC/DC converter are connected together.

7. The fuel cell system of claim 1,
   wherein at least one of a maximum current value of the second DC/DC converter and an upper limit value of a step-up ratio thereof can be changed depending on a type of the electric storage device.

8. The fuel cell system of claim 4,
   wherein a value obtained by multiplying a first value of the output voltage of the fuel cell that is smaller than a second value of the output voltage of the fuel cell at which an output electric power of the fuel cell reaches a maximum level by the upper limit to the step-up ratio of the first DC/DC converter is smaller than a set value of the output voltage of the first DC/DC converter.

* * * * *